(12) United States Patent
Lee et al.

(10) Patent No.: US 9,357,418 B2
(45) Date of Patent: May 31, 2016

(54) MEASUREMENT REPORTING METHOD OF TERMINAL IN WIRELESS COMMUNICATION SYSTEM AND APPARATUS THEREFOR

(75) Inventors: YoungDae Lee, Anyang-si (KR); SungHoon Jung, Anyang-si (KR); SeungJune Yi, Anyang-si (KR); SungDuck Chun, Anyang-si (KR); SungJun Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 133 days.

(21) Appl. No.: 13/979,825

(22) PCT Filed: Feb. 7, 2012

(86) PCT No.: PCT/KR2012/000872
§ 371 (c)(1),
(2), (4) Date: Jul. 15, 2013

(87) PCT Pub. No.: WO2012/108657
PCT Pub. Date: Aug. 16, 2012

(65) Prior Publication Data
US 2013/0294281 A1   Nov. 7, 2013

Related U.S. Application Data

(60) Provisional application No. 61/442,125, filed on Feb. 11, 2011.

(51) Int. Cl.
*H04W 4/00* (2009.01)
*H04W 24/10* (2009.01)
(Continued)

(52) U.S. Cl.
CPC ............. *H04W 24/10* (2013.01); *H04L 1/0031* (2013.01); *H04W 28/048* (2013.01); *H04W 36/0094* (2013.01)

(58) Field of Classification Search
None
See application file for complete search history.

(56) References Cited

U.S. PATENT DOCUMENTS 8,600,424 B2 * 12/2013 Chen et al. .................... 455/522
8,665,692 B2 *  3/2014 Koivisto et al. ............... 370/204
(Continued)

FOREIGN PATENT DOCUMENTS

| KR | 10-2007-0110366 | 11/2007 |
| KR | 10-2010-0006562 | 1/2010 |
| KR | 10-2010-0042662 | 4/2010 |

OTHER PUBLICATIONS

PCT International Application No. PCT/KR2012/000872, Written Opinion of the International Searching Authority dated Sep. 25, 2012, 12 pages.

(Continued)

*Primary Examiner* — Phirin Sam
(74) *Attorney, Agent, or Firm* — Lee, Hong, Degeman, Kang & Waimey

(57) ABSTRACT

The present invention relates to a method for processing a signal of a terminal in a wireless communication system. Specifically, the method comprises the steps of: performing a measurement on a first cell in one or more specific subframes; configuring report information which includes the measurement result, together with an indicator indicating that the measurement has been performed in the one or more specific subframes; and transmitting the report information to a second cell, wherein the one or more specific subframes are configured to have different interference levels from other subframes.

5 Claims, 14 Drawing Sheets

(51) Int. Cl.
*H04W 28/04* (2009.01)
*H04W 36/00* (2009.01)
*H04L 1/00* (2006.01)

(56) References Cited

U.S. PATENT DOCUMENTS

| | | | |
|---|---|---|---|
| 8,737,998 B2* | 5/2014 | Siomina et al. | 455/436 |
| 2011/0217985 A1* | 9/2011 | Gorokhov | 455/452.2 |
| 2011/0228700 A1* | 9/2011 | Mildh et al. | 370/254 |
| 2012/0040620 A1* | 2/2012 | Fu et al. | 455/63.1 |
| 2012/0076025 A1* | 3/2012 | Barbieri et al. | 370/252 |
| 2012/0082052 A1* | 4/2012 | Oteri et al. | 370/252 |
| 2012/0088516 A1* | 4/2012 | Ji et al. | 455/452.1 |
| 2012/0164948 A1* | 6/2012 | Narasimha et al. | 455/63.1 |
| 2012/0176924 A1* | 7/2012 | Wu | H04W 72/0406 370/252 |
| 2013/0301461 A1* | 11/2013 | Vajapeyam et al. | 370/252 |
| 2015/0003275 A1* | 1/2015 | Krishnamurthy | 370/252 |
| 2015/0229457 A1* | 8/2015 | Wu | H04W 72/0406 370/329 |

OTHER PUBLICATIONS

PCT International Application No. PCT/KR2012/000872, Written Opinion of the International Searching Authority dated Sep. 25, 2012, 14 pages.

* cited by examiner

FIG. 3
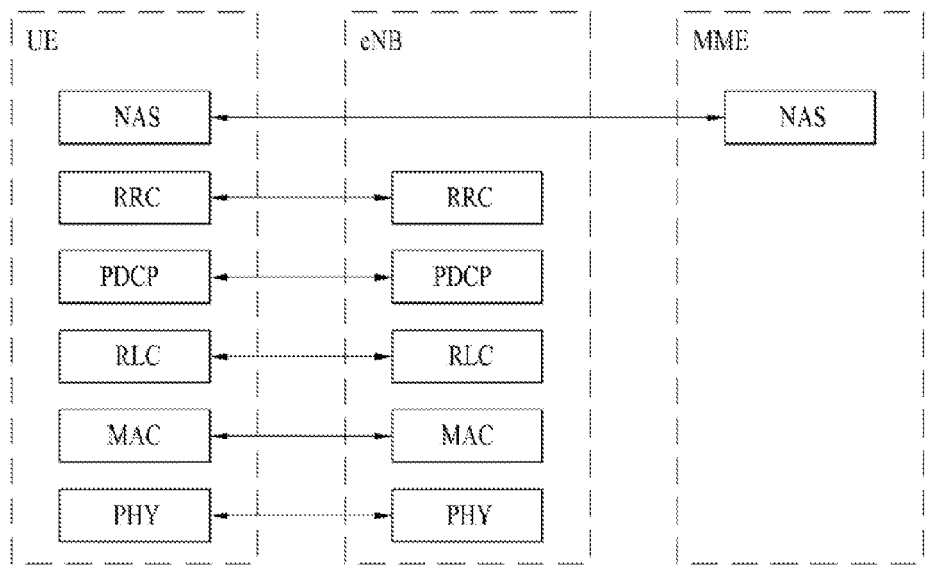
(a) Control-Plane Protocol Stack
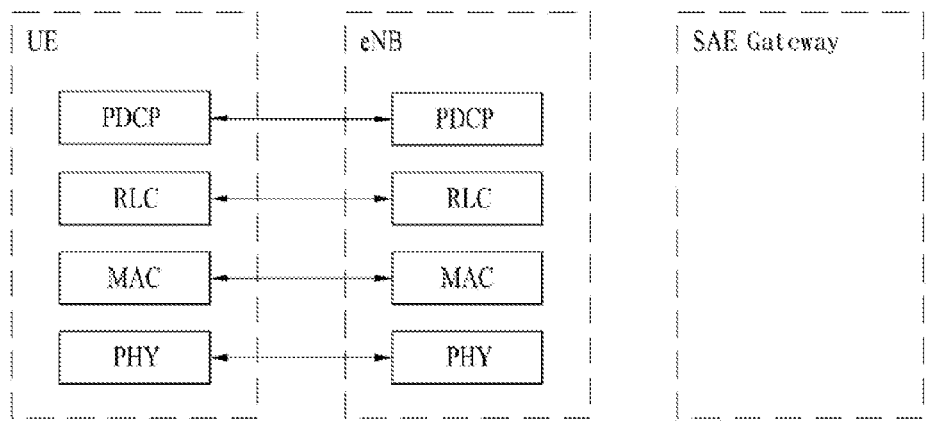
(b) User-Plane Protocol Stack

MEASUREMENT REPORTING METHOD OF TERMINAL IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2012/000872, filed on Feb. 7, 2012, which claims the benefit of U.S. Provisional Application Ser. No. 61/442,125, filed on Feb. 11, 2011, the contents of which are all hereby incorporated by reference herein in their entirety.

FIELD OF THE INVENTION

The present invention relates to a wireless communication system and, more particularly, to a measurement reporting method of a terminal in a wireless communication system and apparatus therefor.

BACKGROUND ART

As an example of a communication system to which the present invention may be applied, a 3GPP LTE ($3^{rd}$ Generation Partnership Project Long Term Evolution; hereinafter referred to as "LTE") communication system will now be broadly described.

FIG. 1 illustrates a general view of an E-UMTS network structure as an example of a communication system. Herein, the E-UMTS (Evolved Universal Mobile Telecommunications System) corresponds to a system evolved from the conventional UMTS (Universal Mobile Telecommunications System). The 3GPP is presently carrying out a basic standardization process for the E-UMTS. Generally, the E-UMTS may also be referred to as an LTE system. For details of the technical specifications of the UMTS and the E-UMTS, reference may be made to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG), which is located at an end of a network (E-UTRAN) and connected to an external network. The base stations can simultaneously transmit multiple data streams for a broadcast service, a multicast service and/or a unicast service.

One or more cells may exist for one base station. One cell is set to one of bandwidths of 1.25, 2.5, 5, 10, 15, and 20 Mhz to provide a downlink or uplink transport service to several user equipments. Different cells may be set to provide different bandwidths. Also, one base station controls data transmission and reception for a plurality of user equipments. The base station transmits Downlink (DL) scheduling information of downlink data to the corresponding user equipment to notify information related to time and frequency domains to which data will be transmitted, encoding, data size, and HARQ (Hybrid Automatic Repeat and reQuest). Also, the base station transmits Uplink (UL) scheduling information of uplink data to the corresponding user equipment to notify information related to time and frequency domains that can be used by the corresponding user equipment, encoding, data size, and HARQ. An interface for transmitting user traffic or control traffic can be used between the base stations. A Core Network (CN) may include the AG and a network node or the like for user registration of the UE. The AG manages mobility of a UE on a TA (Tracking Area) unit basis, wherein one TA unit includes a plurality of cells.

The wireless communication technology has been developed up to the LTE based upon WCDMA. However, the demands and expectations of the users and the manufacturers and providers are growing continuously. Also, since other wireless access technologies are constantly being developed, the wireless communication technology is required to newly evolve in order to ensure competiveness in the future. Accordingly, characteristics, such as reduced cost for each bit, extended service availability, usage of a flexible frequency band, simple structure and open interface, and adequate power consumption of the user equipment are being requested.

DETAILED DESCRIPTION OF THE INVENTION

Technical Objects

Based upon the discussions presented above, a measurement reporting method of a terminal in a wireless communication system and apparatus therefor will hereinafter be proposed.

Technical Solutions

According to an aspect of the present invention, a method of a user equipment processing a signal in a wireless communication system includes performing measurement of a first cell in at least one or more specific subframes; configuring report information, the report information including an indicator indicating that the measurement has been performed in the at least one or more specific subframes and the measurement result; and transmitting the report information to a second cell, and, herein, the at least one or more specific subframes are each configured to have an interference level different from that of other subframes. Herein, both the first cell and the second cell may correspond to the same cell, each of the first cell and the second cell may correspond to a different cell.

Preferably, the method further includes receiving information on the at least one or more specific subframes from the first cell.

Meanwhile, the report information may include information on the at least one or more specific subframes, and the report information may include an identifier of the first cell having performed the measurement.

Furthermore, the method may further include receiving a measurement reporting request message from the second cell, and, in this case, the report information is transmitted to the second cell as a response to the measurement reporting request message.

Additionally, the measurement result may include at least any one of RSRP (Reference Signal Received Power), RSRQ (Reference Signal Received Quality), RSSI (Receiving Signal Strength Indicator), and interference level.

Furthermore, the method may further include transmitting a message indicating that reporting of the measurement result is available, when connection is established with the second cell.

Preferably, when performing measurement, the user equipment is in a connected state with the first cell.

In another aspect of the present invention, a user equipment device included in a wireless communication system includes a wireless communication module configured to transmit and receive a signal to and from a network, and a processor configured to process the signal, and, the processor controls the wireless communication module, so as to perform measurement of a first cell in at least one or more specific subframes, to configure report information, wherein the report information includes an indicator indicating that the measurement has been performed in the at least one or more specific subframes and the measurement result, and to transmit the report information to a second cell, and, herein, the at least one or more specific subframes are each configured to have an interference level different from that of other subframes.

Effects of the Invention

According to the exemplary embodiments of the present invention, the user equipment may perform reporting of the measurement information more efficiently.

The effects that may be gained from the embodiment of the present invention will not be limited only to the effects described above. Accordingly, additional effects of the present application will be set forth in part in the description which follows and in part will become apparent to those having ordinary skill in the art upon examination of the following or may be learned from practice of the present application. More specifically, unintended effects obtained upon the practice of the present invention may also be derived by anyone having ordinary skill in the art.

BRIEF DESCRIPTION OF THE DRAWINGS

FIG. 3 illustrates a Control Plane structure and a User Plane structure of a Radio Interface Protocol between a user equipment and the E-UTRAN based upon the 3GPP radio access network standard.

BEST MODE FOR CARRYING OUT THE PRESENT INVENTION

Hereinafter, reference will now be made in detail to the preferred embodiments of the present invention, examples of which are illustrated in the accompanying drawings. The detailed description of the present invention is provided to facilitate the understanding of the configuration, operation, and other characteristics of the present invention. The following embodiments of the present invention correspond to examples wherein the technical features of the present invention are applied in the 3GPP system.

In the detailed description of the present invention, although the exemplary embodiment of the present invention is described by using an LTE system and an LTE-A system, this is merely exemplary. However, the exemplary embodiment of the present invention may be applied to any type of communication system corresponding to the above-described definition. Furthermore, although the exemplary embodiment of the present invention is described herein based upon an FDD method, this is also merely exemplary. Therefore, the exemplary embodiment of the present invent may be easily modified to be applied to an H-FDD method or a TDD method.

Figure 1:
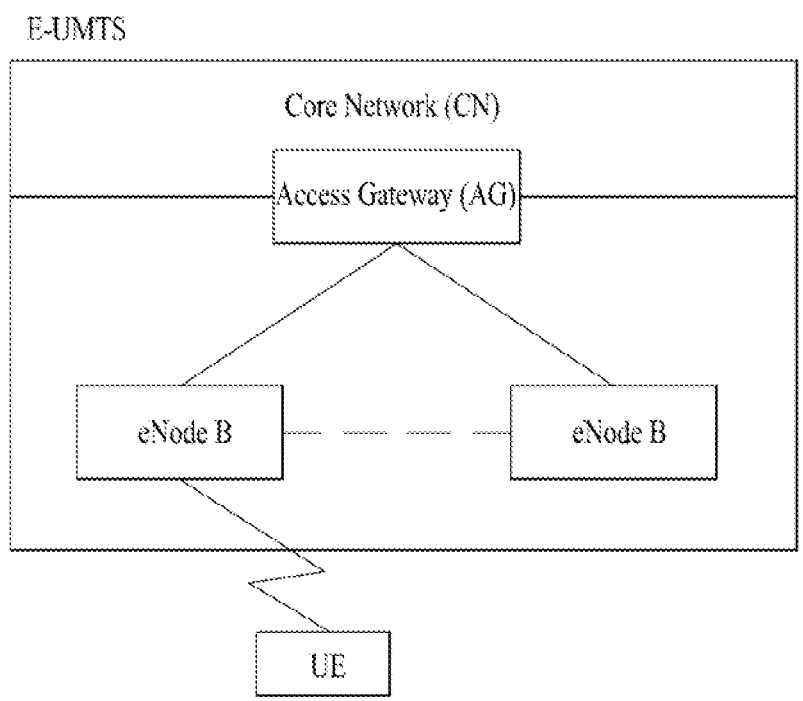
FIG. 1 illustrates a general view of an E-UMTS network structure as an example of a communication system.
Figure 2:
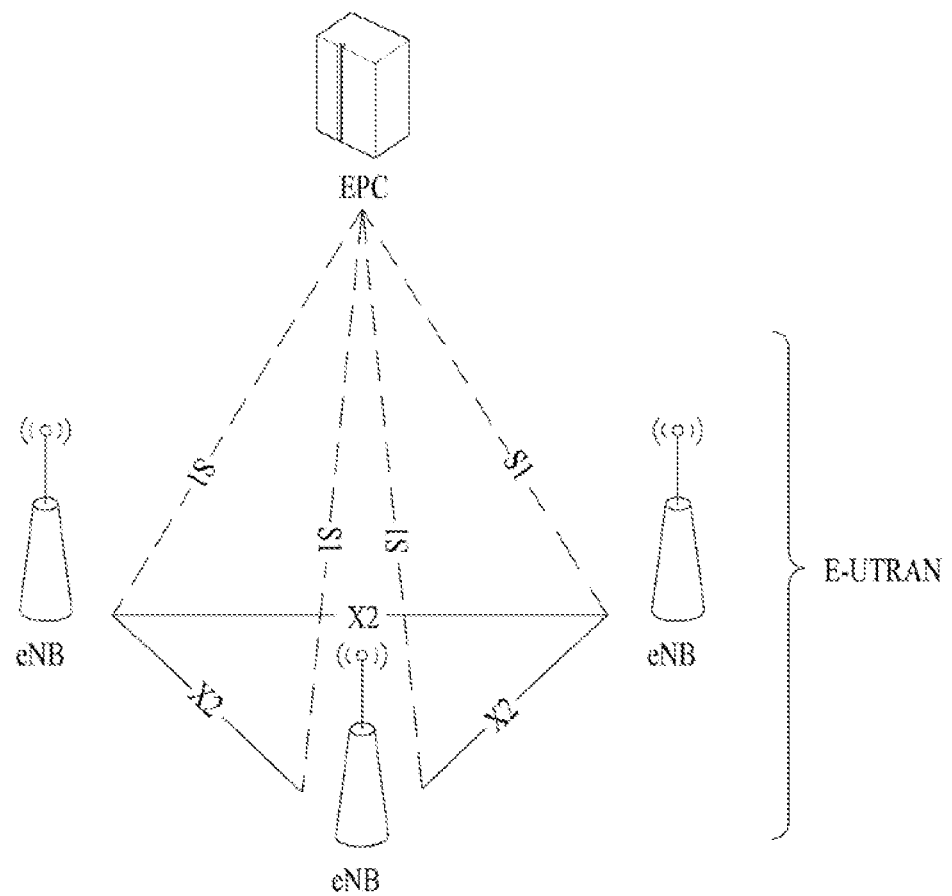
FIG. 2 illustrates an exemplary structure of an E-UTRAN (Evolved Terrestrial Radio Access Network).

FIG. 2 illustrates an exemplary structure of an E-UTRAN (Evolved Terrestrial Radio Access Network). Most particularly, the E-UTRAN system corresponds to an evolved version of the conventional UTRAN system. The E-UTRAN is configured of cells (eNBs), and each cell is connected to one another through an X2 interface and is also connected to an EPC (Evolved Packet Core) through an S1 interface.

The EPC is configured of an MME (Mobility Management Entity), an S-GW (Serving-Gateway), and a PDN-GW (Packet Data Network-Gateway). The MME carries access information of the UE or information on the capability of the UE. Such information is mainly used for managing the mobility of the UE. The S-GW corresponds to a gateway having the E-UTRAN as its end-point, and the PDN-GW corresponds to a gateway having the PDN as its end-point.

FIG. 3 illustrates a Control Plane structure and a User Plane structure of a Radio Interface Protocol between a user equipment and the E-UTRAN based upon the 3GPP radio access network standard. A control plane refers to a path through which control messages are transmitted. Herein, the control messages are used by the User Equipment (UE) and network in order to manage a call. And, a user plane refers to a path through which data generated from an application layer are transmitted. Such data may include audio data or Internet packet data, and so on.

A first layer, which corresponds to a physical layer, uses a physical channel to provide an Information Transfer Service to a higher layer. The physical layer is connected to a Medium Access Control layer, which corresponds to a higher layer, through a Transport Channel. And, herein, data is transported between the Medium Access Control layer and the physical layer through the Transport Channel. In a data transmission between a physical layer of the transmitting end and a physical layer of the receiving end, data are transported between the physical layers through a physical channel. Herein, the physical layer uses time and frequency as radio resource. More specifically, in a downlink, the physical channel is modulated by using an OFDMA (Orthogonal Frequency Division Multiple Access) scheme, and, in an uplink, the physical channel is modulated by using an SC-FDMA (Single Carrier Frequency Division Multiple Access) scheme.

A Medium Access Control (MAC) layer of a second layer provides services to a Radio Link Control (RLC) layer, which corresponds to higher layer, through a logical channel. The Radio Link Control (RLC) layer of the second layer supports the transmission of reliable data. The function of the RLC layer may also be realized by a functional block within the MAC. A PDCP (Packet Data Convergence Protocol) layer of the second layer performs a header compression function, which can reduce unnecessary control information in order to efficiently transmit IP packets, such as IPv4 or IPv6, in a wireless (or radio) interface having a narrow bandwidth.

A radio resource control (RRC) layer which is positioned in a lowermost portion of a third layer is defined only in the control plane. And, in relation with the configuration, re-configuration, and release of Radio Bearers (RBs), the RRC layer performs the role of controlling the logical channels, the transmission channels, and the physical channels. The Radio Bearer refers to a service that is provided by the second layer in order to deliver (or transport) data between the UE and the network. In order to do so, the RRC layers of the UE and the network exchanges RRC messages to and from one another.

One cell that configures a base station (eNB) is set to one of bandwidths of 1.25, 2.5, 5, 10, 15, 20 Mhz, thereby providing a downlink or uplink transport service to several user equipments. Different cells may be set to provide different bandwidths.

In the network, downlink transmission channels that transmit data to the UE include a BCH (Broadcast Channel), which transmits system information, a PCH (Paging Channel), which transmits paging messages, and a downlink SCH (Shared Channel), which transmits information other than the system information, such as user traffic or control messages. In case of traffic information or control messages of a downlink multicast or broadcast service, the corresponding data may be transmitted through a downlink SCH or may also be transmitted through a separate downlink MCH (Multicast Channel).

Meanwhile, uplink transmission channels that transmit data from the UE to the network include a RACH (Random Access Channel), which transmits initial control messages, and an uplink SCH (Shared Channel), which transmits information other than the system information, such as user traffic or control messages. Logical Channels being in a level higher than the transmission channel and being mapped to the transmission channel include a BCCH (Broadcast Channel), a PCCH (Paging Control Channel), a CCCH (Common Control Channel), an MCCH (Multicast Control Channel), an MTCH (Multicast Traffic Channel), and so on.

Figure 4:
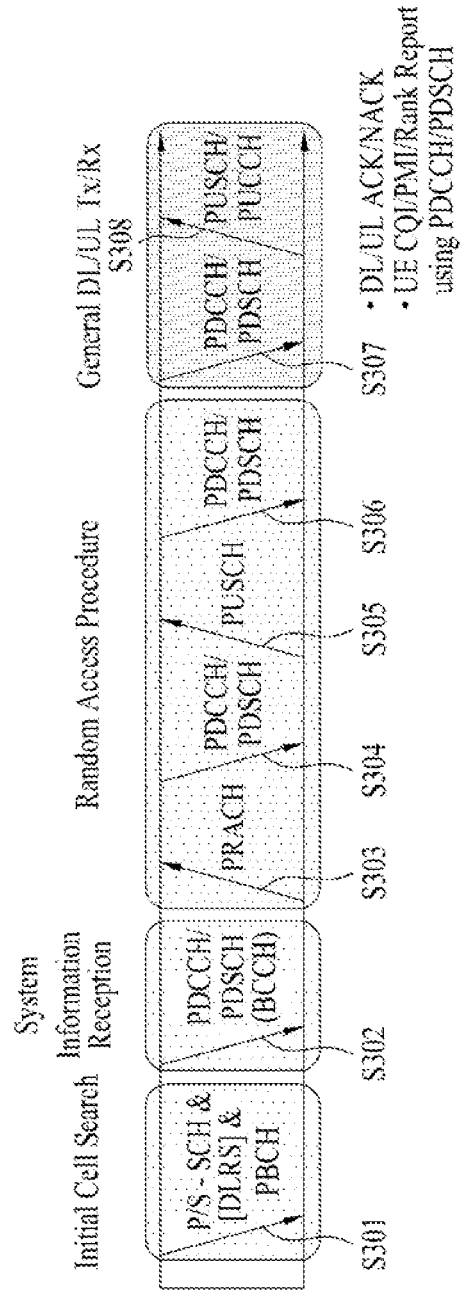
FIG. 4 illustrates physical channels that are used in the 3GPP system and a general method for transmitting signals using such physical channels.

FIG. 4 illustrates physical channels that are used in the 3GPP system and a general method for transmitting signals using such physical channels.

The user equipment performs initial cell search such as synchronization with the base station, when it newly enters a cell or when the power is turned on (S301). In order to do so, the user equipment synchronizes with the base station by receiving a Primary Synchronization Channel (P-SCH) and a Secondary Synchronization Channel (S-SCH) from the base station, and then acquires information such as cell ID, and so on. Thereafter, the user equipment may acquire broadcast information within the cell by receiving a Physical Broadcast Channel from the base station. Meanwhile, in the step of initial cell search, the user equipment may receive a Downlink Reference Signal (DL RS) so as to verify the downlink channel status.

Once the user equipment has completed the initial cell search, the corresponding user equipment may acquire more detailed system information by receiving a Physical Downlink Control Channel (PDCCH) and a Physical Downlink Control Channel (PDSCH) based upon the respective information carried in the PDCCH (S302).

Meanwhile, if the user equipment initially accesses the base station, or if there are no radio resources for signal transmission, the user equipment may perform a Random Access Procedure (RACH) with respect to the base station (S303 to S306). In order to do so, the user equipment may transmit a specific sequence to a preamble through a Physical Random Access Channel (PRACH) (S303 and S305), and may receive a response message respective to the preamble through the PDCCH and the PDSCH corresponding to the PDCCH (S304 and S306). In case of a contention based RACH, a Contention Resolution Procedure may be additionally performed.

After performing the above-described process steps, the user equipment may perform PDCCH/PDSCH reception (S307) and Physical Uplink Shared Channel (PUSCH)/Physical Uplink Control Channel (PUCCH) transmission (S308), as general uplink/downlink signal transmission procedures. Most particularly, the user equipment receives Downlink Control Information (DCI) through the PDCCH. Herein, the DCI includes control information, such as resource allocation (or assignment) information respective to the corresponding user equipment, and each format of the DCI may differ from one another depending upon the purpose of the corresponding DCI.

Meanwhile, the control information, which is transmitted by the user equipment to the base station or received by the user equipment from the base station via uplink, includes downlink/uplink ACK/NACK signals, a CQI (Channel Quality Indicator), a PMI (Precoding Matrix Index), an RI (Rank Indicator), and so on. In case of the 3GPP LTE system, the user equipment may transmit control information, such as the above-described CQI/PMI/RI through the PUSCH and/or the PUCCH.

Figure 5:
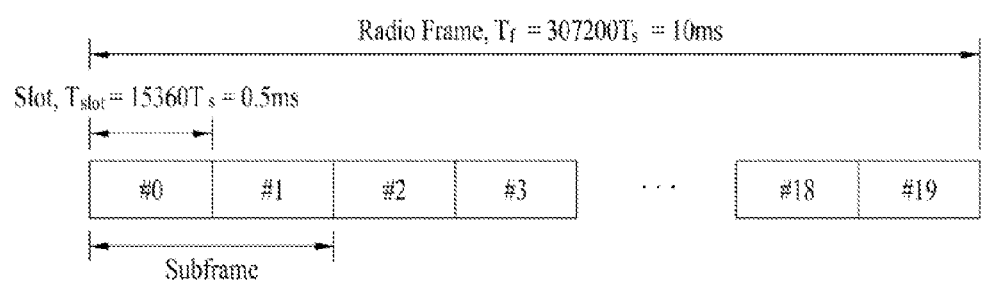
FIG. 5 illustrates an exemplary structure of a radio frame that is used in the LTE system.

FIG. 5 illustrates an exemplary structure of a radio frame that is used in the LTE system.

Referring to FIG. 5, a radio frame has the length of 10 ms ($327200 \times T_S$) and is configured of 10 subframes each having the same size. Each subframe has the length of 1 ms and is configured of 2 slots. Each slot has the length of 0.5 ms ($15360 \times T_S$). Herein, $T_S$ represents a sampling time and is indicated as $T_S=1/(15 \text{ kHz} \times 2048)=3.2552 \times 10^{-8}$ (approximately 33 ns). A slot includes a plurality of OFDM symbols in the time domain and includes a plurality of Resource Blocks (RBs) in the frequency domain. In the LTE system, one resource block includes 12 subcarriers×7(6) OFDM symbols. A TTI (Transmission Time Interval), which corresponds to a unit time during which data are transmitted, may be decided as one or more subframe units. Herein, the above-described radio frame structure is merely exemplary. And, therefore, the number of subframes included in a radio frame, or the number of slots included in a subframe, or the number of OFDM symbols included in a slot may be diversely varied.

Hereinafter, an RRC state of the user equipment and the RRC connection method will be described. The RRC state refers to whether or not the RRC of a user equipment and the RRC of an E-UTRAN are connected to one another via logical connection. And, if the logical connection is established, the RRC state is referred to as an RRC connected state (RRC_CONNECTED), and if the logical connection is not established, the RRC state is referred to as an RRC idle state (RRC_IDLE).

Since the E-UTRAN can determine the presence of a user equipment being in the RRC_CONNECTED state in cell units, the E-UTRAN may effectively control the user equipment. Conversely, the E-UTRAN cannot determine the presence of a user equipment being in the RRC_IDLE state in cell units, and instead the user equipment being in the RRC_IDLE state is managed by a CN in TA units, the TA unit corresponding to an area unit larger than the cell unit. More specifically, in order to allow a user equipment being in the RRC_IDLE state to receive an audio service or a data service from a cell, the corresponding user equipment should be shifted to the RRC_CONNECTED state.

Most particularly, when the user has first turned on the power of the user equipment, the user equipment first searches for an adequate cell and remains in the RRC_IDLE state in the corresponding cell. The user equipment remaining in the RRC_IDLE state may perform an RRC connection establishment procedure with the RRC of the E-UTRAN only when the user equipment is required to establish RRC connection, thereby being shifted to the RRC_CONNECTED state. Herein, a case when the user equipment is required to establish RRC connection refers to a case when uplink data transmission is required due to reasons, such as a user's attempt to make (or establish) a call, or when the user equipment is required to transmit a response message respective to a paging message transmitted from the E-UTRAN.

Figure 6:
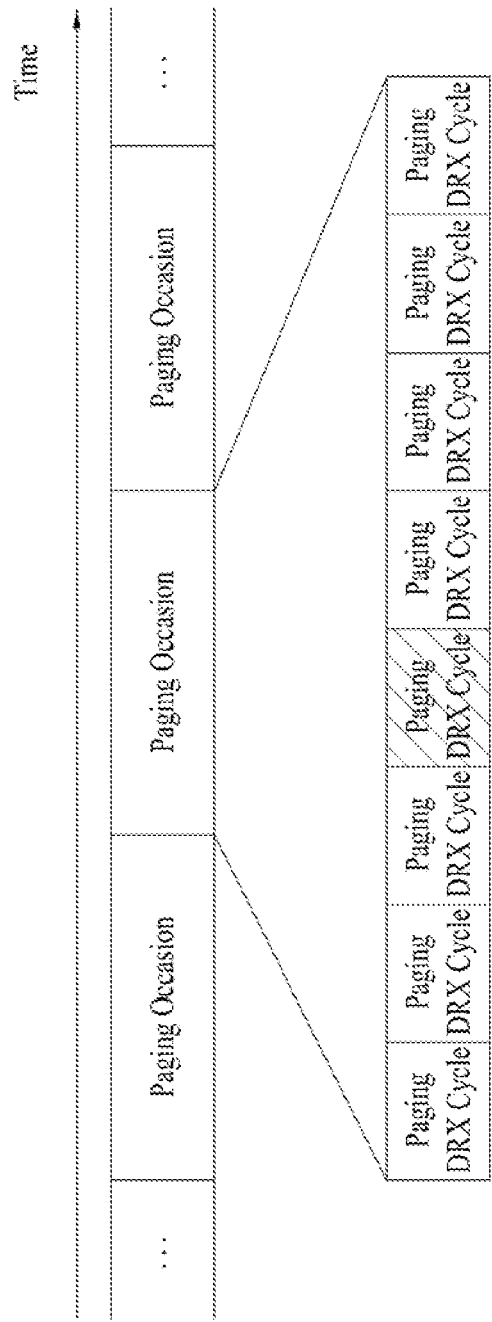
FIG. 6 illustrates a general transmitting/receiving method using a paging message.

FIG. 6 illustrates a general transmitting/receiving method using a paging message.

Referring to FIG. 6, a paging message includes a Paging Cause and a Paging record, which is configured of a user equipment identity (UE Identity), and so on. When receiving the Paging message, the user equipment may perform Discontinuous Reception (DRX) for the purpose of reducing power consumption.

More specifically, the network configures multiple Paging Occasions (POs) at each time cycle, which is referred to as a Paging DRX Cycle. And, a specific user equipment may only receive a specific paging occasion, so as to acquire a paging message. At a time other than the specific paging occasion, the user equipment does not receive any paging channel and may remain in an idle state in order to reduce power consumption. One paging occasion correspond to one TTI.

The base station and the user equipment use a Paging Indicator (PI) as a specific value for notifying the transmission of a paging message. The base station defines a specific identifier (e.g., Paging-Radio Network Temporary Identity; P-RNTI) for the purpose of the PI, thereby being capable of notifying the transmission of the paging information to the user equipment. For example, the user equipment may wake up at least DRX cycle and may receive a subframe in order to notify whether or not a paging message has appeared. Then, when a P-RNTI exists in an L1/L2 control channel (PDCCH) of the received subframe, the user equipment may determine that a paging message exists in the PDSCH of the corresponding subframe. Additionally, when a UE Identifier (e.g., IMSI) of the user equipment itself exists in the paging message, the user equipment may then respond (e.g., perform RRC connection or receive system information) to the base station, so as to receive service.

Hereinafter, System Information will be described in detail. The system information includes required information that should be known by the user equipment in order to access the base station. Therefore, the user equipment is required to receive all system information prior to accessing the base station. And, additionally, the user equipment is required to be always provided with the latest (or most recent) system information. Moreover, since the system information corresponds to information that should be known by all user equipments included in a single cell, the base station periodically transmits the system information.

The system information may be divided into MIB (Master Information Block), SB (Scheduling Block), and SIB (System Information Block). The MIB allows the user equipment to be aware of a physical structure, e.g., bandwidth, of the corresponding cell. The SB notifies transmission information, e.g., transmission cycle, of the SIBs. And, the SIB corresponds to a collection of system information being correlated with one another. For example, a specific SIB includes only information on neighboring cells, and another SIB includes information on an uplink radio channel used by the user equipment.

Hereinafter, measurement and measurement reporting will be described.

In the following description, 'measurement' may be defined as having the user equipment receive a reference signal, which is received from cells located in inter-frequency, intra-frequency, and inter-RAT, depending upon measurement settings received by the user equipment from the network, and having the user equipment measure quality values of the corresponding cell. Additionally, in the following description, 'quality' may signify signal quality or cell quality being determined through the reference signal, which is received from the measurement target cell.

In the mobile communication system, with respect to supporting mobility of the user equipment, the user equipment consistently (or continuously), at least at each Discontinuous Reception (DRX) cycle period, measures the quality of a service cell currently providing service and the quality of a neighboring cell. The user equipment reports the cell quality measurement result to the network at an appropriate (or adequate) time, and the network provide optimal mobility to the user equipment through handover, and so on.

In addition to the purpose of supporting mobility, in order to provide information that may be useful and helpful to a provider managing a network, the user equipment may perform measurement of a particular purpose determined by the network and may report the cell quality measurement result to the network. For example, the user equipment receives broadcast information of a specific cell decided by the network. The user equipment may report a Cell Identity of the specific cell (this may also be referred to as a Global cell identity) and location identification information (e.g., Tracking Area Code), to which the specific cell belongs, and/or other cell information (e.g., whether or not the corresponding cell is a CSG (Closed Subscriber Group) member) to a serving cell.

When the user equipment is in a mobile state, after having verified that the quality of a specific region (or area) is very poor (or low) through measurement, the user equipment may report the location information respective to the cell having poor (or low) quality and may also report the cell quality measurement result to the network. Then, based upon the cell quality measurement results of the user equipments assisting in the management and operation of the network, the network may seek optimization of the network.

In a mobile communication system having a Frequency reuse factor of 1, the mobility is mostly realized between different cells within the same frequency band. Therefore, in order to adequately ensure the mobility of the user equipment, the user equipment should be capable of accurately measuring the quality and cell information of neighboring cells having the same center frequency as the center frequency of the serving cell. As described above, the measurement of a cell having the same center frequency as the center frequency of the serving cell is referred to as an intra-frequency measurement. By performing the intra-frequency measurement, the user equipment may report the cell quality measurement result to the network at an adequate time, so that the purpose of the corresponding cell quality measurement result can be realized.

A mobile communication service provider may operate a network by using multiple frequency bands. When a service of a communication system is being provided through multiple frequency bands, in order to ensure optimal mobility to the user equipment, the user equipment should be capable of accurately measuring the quality and cell information of neighboring cell having a different center frequency from the center frequency of the serving cell. As described above, the measurement of a cell having a different center frequency from the center frequency of the serving cell is referred to as an inter-frequency measurement. By performing the inter-frequency measurement, the user equipment should be capable of reporting the cell quality measurement result to the network at an adequate time.

When the user equipment supports measurement of a heterogeneous network, the user equipment may also perform measurement of a cell belonging to the heterogeneous network based upon the base station settings. Such, heterogeneous network measurement is referred to as an inter-RAT (Radio Access Technology) measurement. For example, a RAT may include a UTRAN (UMTS Terrestrial Radio Access Network) and a GERAN (GSM EDGE Radio Access Network), which follow the 3GPP standard, and the RAT may also include a CDMA 2000 system, which follows the 3GPP2 standard.

Hereinafter, a Minimization of Drive Test (MDT) method will be described.

The MDT refers to having a service provider measure the quality of a cell by using a motor vehicle (or automobile) in order to optimize cell coverage. Instead of the related art method of performing a drive test, the MDT may perform measurement on all user equipments existing within the cell and may report the corresponding measurement results. Accordingly, a cell coverage map may be generated, and the time and cost required for optimizing the network may be minimized.

The MDT may be divided into two different types, one being a Logged MDT and the other being an Immediate MDT. The Logged MDT corresponds to a method of having the user equipment perform measurement for the MDT and, then, having the respective data stored in an MDT log and delivered to the network at a specific time point. The Immediate MDT corresponds to a method of having the measurement for the MDT performed and having the respective data immediately transmitted to the network. The difference between the two methods lies in whether the user equipment immediately reports the measurement result to the base station, or whether the user equipment temporarily stores the measurement result and then reports the stored result to the base station later on, and, in case of a user equipment being in an RRC Idle state, since there is not RRC connection, the user equipment cannot immediately report the quality measurement result, and, therefore, the user equipment is required to use the Logged MDT.

Figure 7:
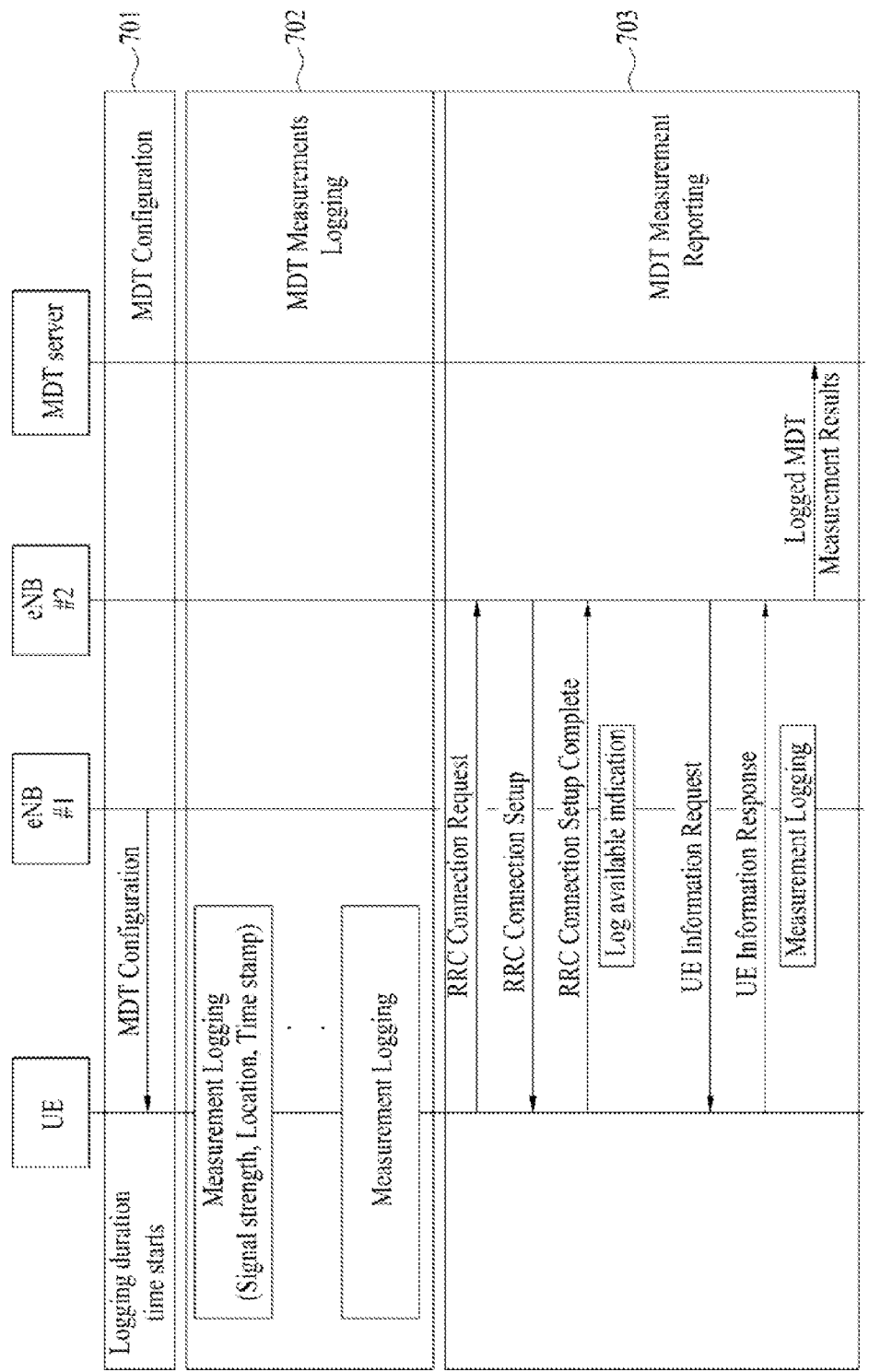
FIG. 7 illustrates a structure of MTC (Machine type communication).

FIG. 7 illustrates a flow chart of a signal for performing a Logged MDT method.

Referring to FIG. 7, in order to perform the Logged MDT, the user equipment may first receive a message including Logged MDT settings from a cell, as shown in step 701.

The Logged MDT settings received by the user equipment may include triggering settings, which starts (or triggers) the logging of an incident, MDT setting duration, area settings for performing MDT, and so on.

Subsequently, once the user equipment receives the Logged MDT settings, in step 702, the user equipment immediately discloses a timer respective to the valid Logged MDT settings. Only during the operation period of the duration time, the user equipment stores the measurement result for the Logged MDT in the RRC idle state in the MDT log at predetermined intervals (or cycle periods). Herein, the predetermined interval refers to an interval (or cycle period) for storing the measurement result respective to the Logged MDT settings in the MDT log and may hereinafter be referred to as a logging interval (or cycle period), which may generally be expressed as a multiple of the DRX cycle period.

Meanwhile, when the duration timer is expired, the user equipment deletes the MDT settings. However, the user equipment may maintain the stored MDT cell quality measurement result for a predetermined period of time (e.g., 48 hours), thereby being provided with an additional opportunity to report (or occasion for reporting) the stored MDT measurement value to the cell during this particular period of time.

The value that is measured for the MDT generally corresponds to the quality of a camp on cell, and this is measured by an RSRP (Reference Signal Received Power) and an RSRQ (Reference Signal Received Quality). When a Logged MDT is set-up in the user equipment, the user equipment measured the quality of the corresponding cell while in the RRC idle mode and, then, after storing the measured value, the user equipment reports the MDT value to the network later on.

The service provider may collect the MDT values received from multiple user equipments and may create a coverage map, which indicates whether or not service can be provided throughout the overall area, to which the service provider provides services, and also indicates the distribution of quality levels of each service, so as to use the created coverage map to perform network operation and optimization. For example, when a coverage problem in a specific area (or region) is reported, the service provider increases transmission power of the base station, which provides services to the corresponding area, thereby being capable of expanding the coverage of the corresponding area cell.

The result of the cell quality measurement for the MDT may be alternatively referred to as a log, a user equipment log value, a measurement value, a cell quality measurement result, and so on. However, in order to simplify the description of the present invention, the term will hereinafter be referred to as an MDT measurement result.

Finally, a process of reporting an MDT measurement result of step 703 will be described.

When the user equipment performs Logged MDT, and when a stored MDT measurement result exists in the user equipment, and when the user equipment establishes an RRC connection (i.e., during an RRC connection establishment procedure), the user equipment may notify the network that an MDT measurement result is stored therein through an RRC connection setup complete message.

After receiving the notification that the MDT measurement result is stored in the user equipment from the user equipment, the network sends a command to the user equipment commanding the user equipment to transmit the stored MDT cell quality measurement result, and, in response to this command, the user equipment transmits the stored MDT measurement result to the network.

Other than the case of establishing an RRC connection, even in the case when the user equipment performs RRC connection re-establishment, the user equipment may also notify the network that an MDT measurement result is stored therein through an RRC connection re-establishment complete message. Additionally, when the user equipment performs a handover from the Serving cell to a Target cell, the user equipment may notify that the MDT measurement result is stored in the Target cell through a handover complete message.

In an LTE-A system, research on eICIC (enhanced Inter Cell Interference Coordination) for reducing the interference between a first base station (eNB1) and a second base station (eNB2) in a Heterogeneous network (HetNet) is currently in progress. Herein, an ABS (almost blank subframe) is most typically taken into consideration, and it will be determined that only a CRS (Cell-specific RS) can be transmitted from the subframe, which is designated as the ABS.

Figure 8:
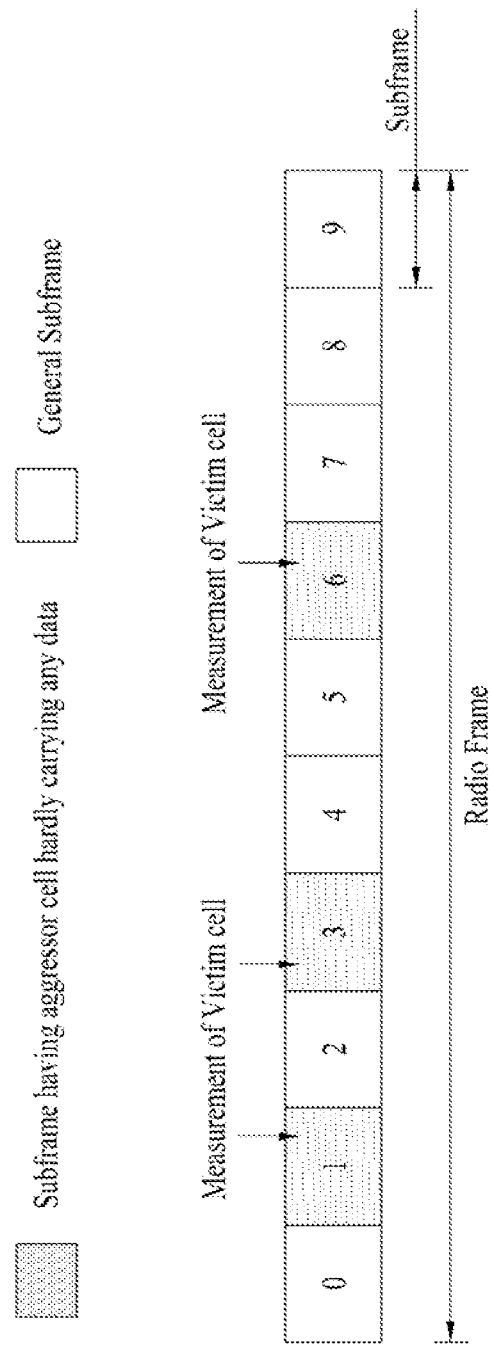
FIG. 8 illustrates an exemplary application of the eICIC method in the time domain.

FIG. 8 illustrates an exemplary application of the eICIC method in the time domain.

Referring to FIG. 8, an interfered (or victim) cell may be aware that measurement is performed in subframe indexes 1, 3, and 6. Herein, the subframe indexes 1, 3, and 6 may respectively indicate subframes, to which the interfering cell (or aggressor) cell does not transmit data, and may also indicate the ABS. Evidently, it will be preferable that settings are made so that the subframe, which is designated as the ABS, can only transmit the CRS.

Meanwhile, the eICIC method respective to the time domain for the RRC idle state user equipment may be applied to cases corresponding to macro cell-to-femto cell, macro cell-to-pico cell, and so on. More specifically, as a cell configuration (or cell structure) being considered in the LTE-A system, macro cell-to-femto cell, macro cell-to-pico cell, and so on may exist, and it will be assumed that, in the macro cell-to-femto cell, there is no information exchange through an X2 interface, which corresponds to an inter-cell interface, and that, in the macro cell-to-pico cell, information exchange may be performed through the X2 interface.

First of all, a macro cell-to-pico cell scenario will hereinafter be described.

Figure 9:
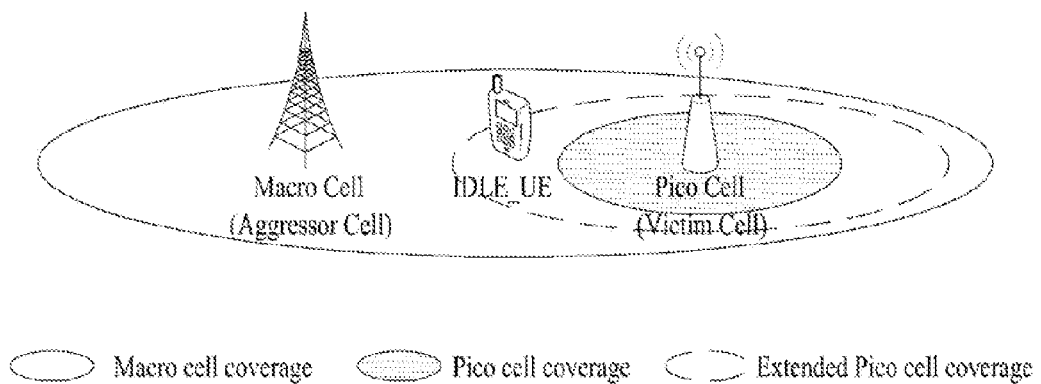
FIG. 9 illustrates a macro cell-to-pico cell scenario, wherein the eICIC method is applied.

FIG. 9 illustrates a macro cell-to-pico cell scenario, wherein the eICIC method is applied.

Referring to FIG. 9, when a macro cell and a pico cell using the same frequency resource are adjacent to one another, and when the RRC idle user equipment is located within the coverage of the pico cell yet receives a stronger (or more intense) signal from the macro cell, the user equipment selects the macro cell during the cell selection/re-selection procedure.

In this case, by adopting the eICIC method respective to the time domain for the purpose of expanding the coverage of the pico cell, and by restricting a pico cell measurement subframe pattern of the user equipment to a specific subframe having little interference from the macro cell, during the cell selection/re-selection procedure, the user equipment may select and access the macro cell instead of the pico cell. In this case, each of the macro cell and the pico cell respectively becomes an aggressor cell and a victim cell.

Subsequently, a macro cell-to-femto cell scenario will hereinafter be described.

Figure 10:
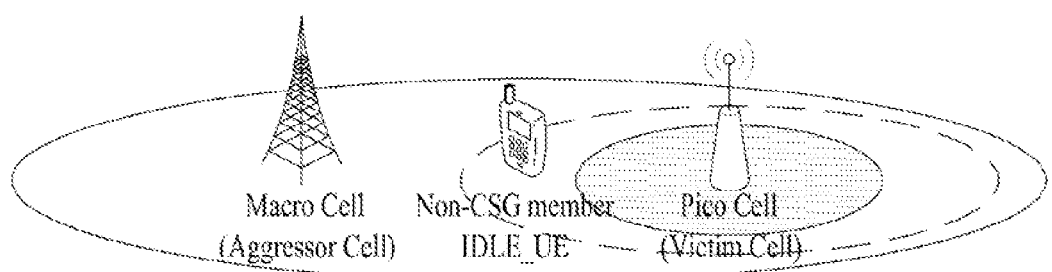
FIG. 10 illustrates a macro cell-to-femto cell scenario, wherein the eICIC method is applied.

FIG. 10 illustrates a macro cell-to-femto cell scenario, wherein the eICIC method is applied.

Referring to FIG. 10, a macro cell and a femto cell using the same frequency resource are adjacent to one another, and the RRC idle state user equipment, which is located with the coverage of the femto cell even though the user equipment does not correspond to a member of the femto cell, may not be capable of locating a cell for establishing an RRC connection, i.e., a suitable cell due to the intense interference of the femto cell during the cell selection/re-selection procedure.

In this case, in order to allow the user equipment, which is located in the coverage of the femto cell, to access a neighboring macro cell without any interference from the femto cell, the eICIC method respective to the time domain may be adopted, so that the macro cell measurement subframe pattern of the user equipment can be limited (or restricted to a specific subframe having little interference from the femto cell. Therefore, during the cell selection/re-selection procedure, the user equipment may be capable of selecting and accessing the macro cell. In this case, each of the macro cell and the femto cell respectively becomes a victim cell and an aggressor cell.

When the user equipment being in an RRC connected state with the serving cell detects an RLF (Radio Link Failure) or a Handover Failure, the user equipment stores information on the radio link failure occurrence, i.e., the RLF information. As described above, once the RLF information is stored, during the RRC Connection Reestablishment procedure the user equipment reports the availability of the RLF information to the base station through an RRC Connection Reestablishment Request message. Additionally, the user equipment may also report the availability of the RLF information to the base station through an RRC Connection Reconfiguration message.

Furthermore, in case the RRC Connection Reconfiguration procedure is failed, the user equipment may be shifted to the RRC idle state, and, thereafter, the RRC layer of the user equipment performs an RRC Connection Configuration procedure in accordance with the instructions of the NAS layer, thereby shifting the user equipment back to the RRC connected state. In this case, during the RRC Connection Configuration procedure, the user equipment may report the availability of the RLF information to the base station through an RRC Connection Configuration Complete message.

As described above, when the user equipment reports the availability of the RLF information, the base station transmits a UE information request message, so as to request for RLF information to the user equipment. When the user equipment receives the UE information request message, the UE reports the RLF information through a UE information response message. The RLF information may include a channel measurement value of a last serving cell and a channel measurement of a neighboring cell, information on a cell in which the RLF has occurred, location information on the cell in which the RLF has occurred, information on whether or not the radio link failure is caused by an RLF or a handover failure, an ID of a cell attempting to perform RRC connection re-configuration.

In the related art, when the user equipment detects an RLF or a handover failure, the user equipment may report the RLF information to the base station. In this case, regardless of whether or not the user equipment performs communication with the base station through an ABS (Almost Blank Subframe), the user equipment may report the RLF information including the channel measurement value of a last serving cell, the channel measurement of a neighboring cell, and so on, to the base station. At this point, since the network is incapable of knowing to which subframe type the channel measurement value included in the received RLF information corresponds, there may occur a problem in that the channel measurement value cannot be used for the correct purpose.

Therefore, it will be proposed in the description of the present invention that the user equipment may measure a radio signal during one specific subframe, that the user equipment may create report information notifying through which subframe the measurement process has been performed, and that the user equipment may transmit the corresponding report information to the base station.

Herein, the report information may include a measurement result value of the radio signal, and, preferably, the report information corresponds to a message reporting the measurement result. Additionally, the specific subframe may be configured to have a different interference level as compared to other subframes, and, for example, the specific subframe may correspond to an ABS.

Additionally, the user equipment may detect a radio link failure and may create the report information accordingly, and, when a request is made from the base station, the user equipment may transmit the report information.

Figure 11:
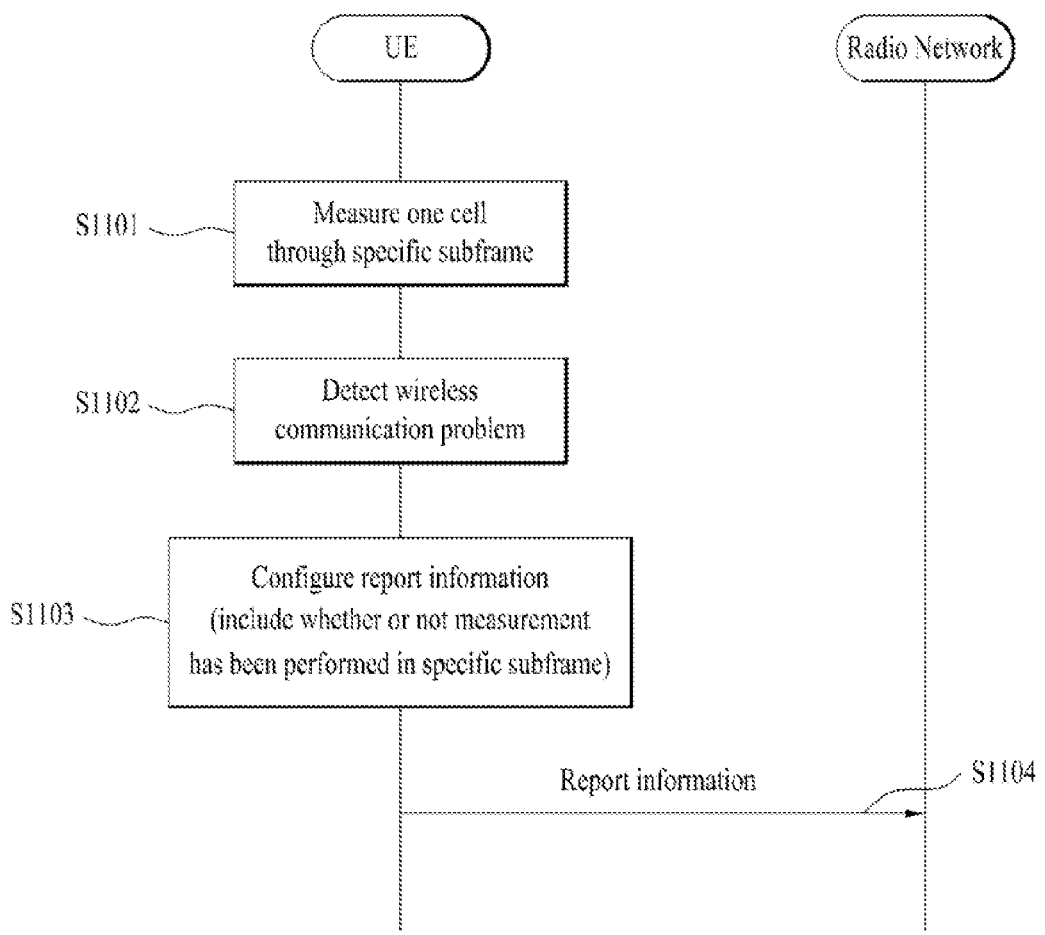
FIG. 11 illustrates a flow chart showing a measurement reporting method according to the present invention.

FIG. 11 illustrates a flow chart showing a measurement reporting method according to the present invention. Most particularly, the subframes being provided by the specific cell in FIG. 11 may be divided into general subframes and specific subframes, and each of the general subframes and specific subframes may be differentiated based upon the interference level. Preferably, the specific frame may correspond to an ABS, which is configured to receive less interference from the neighboring cell.

In step 1101, the user equipment measure a radio signal from one cell of a radio network through the specific subframes e.g., ABS). By performing such measurement process, the channel quality of the corresponding cell, e.g., RSRP (Reference Signal Received Power), RSRQ (Reference Signal Received Quality), RSSI (Receiving Signal Strength Indicator), interference level, and so on may be deduced as the measurement result.

If a radio link failure is detected, as shown in step 1102, the user equipment configures the report information in step 1103. The detected radio link failure may include a case when the RLF or handover failure has occurred due to an increase in the interference or due to a coverage hole, a case when the HARQ re-transmission is performed as many times as the maximum number of re-transmissions, a case when a security failure has occurred, as so on.

Additionally, the report information may include 1) the measurement result (e.g., RSRP/RSRQ/RSSI/interference level measurement value) of step 1101, 2) information indicating whether or not the measurement result of step 1101 corresponds to a measurement result received from the specific subframes, 3) an identifier of the cell measured in step 1101, 4) information on the subframe received in step 1101, i.e., subframe pattern, and 5) information on different types and causes of the detected radio link failure.

Finally, the user equipment transmits the report information, which is configured in step 1104, to the network. At this point, the report information may be transmitted through the RRC layer, and the report information may be included in the measurement reporting message or the UE information response message.

Figure 12:
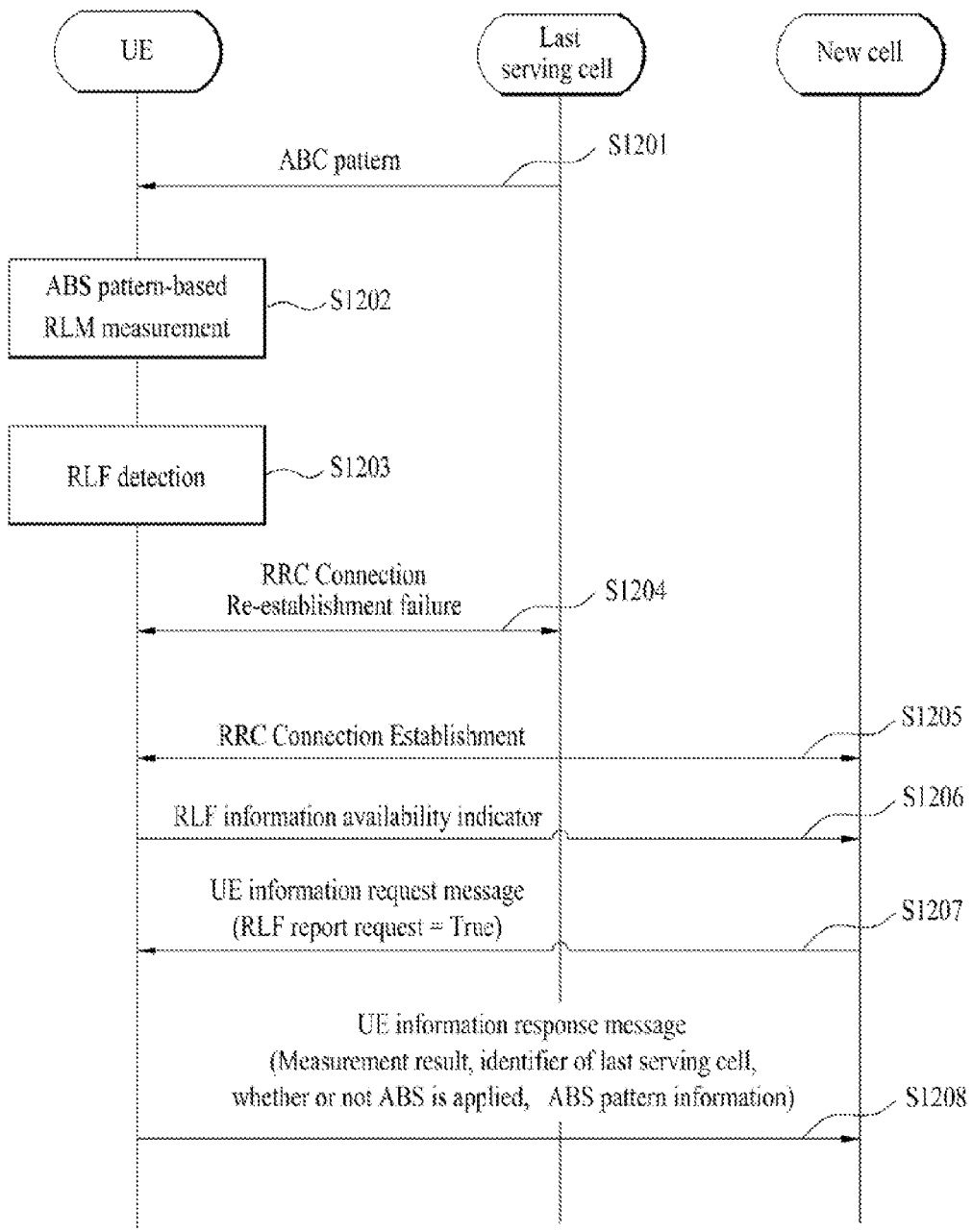
FIG. 12 illustrates a flow chart showing an RLF reporting method according to the present invention.

FIG. 12 illustrates a flow chart showing an RLF reporting method according to the present invention.

Referring to FIG. 12, in order to receive a signal from a serving cell or from specific neighboring cells in a state when the Inter-cell interference has been minimized, the user equipment may receive an ABS pattern from the serving cell in step 1201.

Additionally, in step 1202, based upon the ABS pattern, the user equipment measures the quality of the serving cell for the RLM (Radio Link Management). More specifically, the ABS performs the measurement process. In this case, the user equipment detects the RLF of the serving cell in step 1203 and configures and stores RLF information. At this point, the RLF information that is being stored includes the measurement result of the last serving cell and the cell identifier of the last serving cell, information on whether or not the measurement result has adopted the ABS, and the ABS pattern determined in the last serving cell.

Meanwhile, after detecting the RLF, the user equipment may perform an RRC connection re-establishment procedure. However, if the RRC connection re-establishment procedure fails, as shown in step 1204, the user equipment is shifted to the RRC idle state.

In the RRC idle state, the user equipment RRC layer may select a new cell, and, in accordance with the request of the NAS layer, the RRC Connection establishment procedure may be initiated, as shown in step 1205. At this point, as shown in step 1206, the user equipment may include an indicator notifying the availability of the RLF information in the RRC connection establishment complete message.

Subsequently, in case the RLF information is available, the new cell transmits a UE information request message including the RLF reporting request indicator to the user equipment, as shown in step 1207.

In case an RLF reporting request indicator is included in the received message, as shown in step 1208, the user equipment may configure a UE information response message and may transmit the configured message to the new cell. At this point, the UE information response information may include the measurement result of the last serving cell and the cell ID of the last serving cell, information on whether or not the measurement result has adopted the ABS, and the ABS pattern determined in the last serving cell.

Meanwhile, the measurement reporting method according to the present invention may also be applied to the above-described MDT method.

Figure 13:
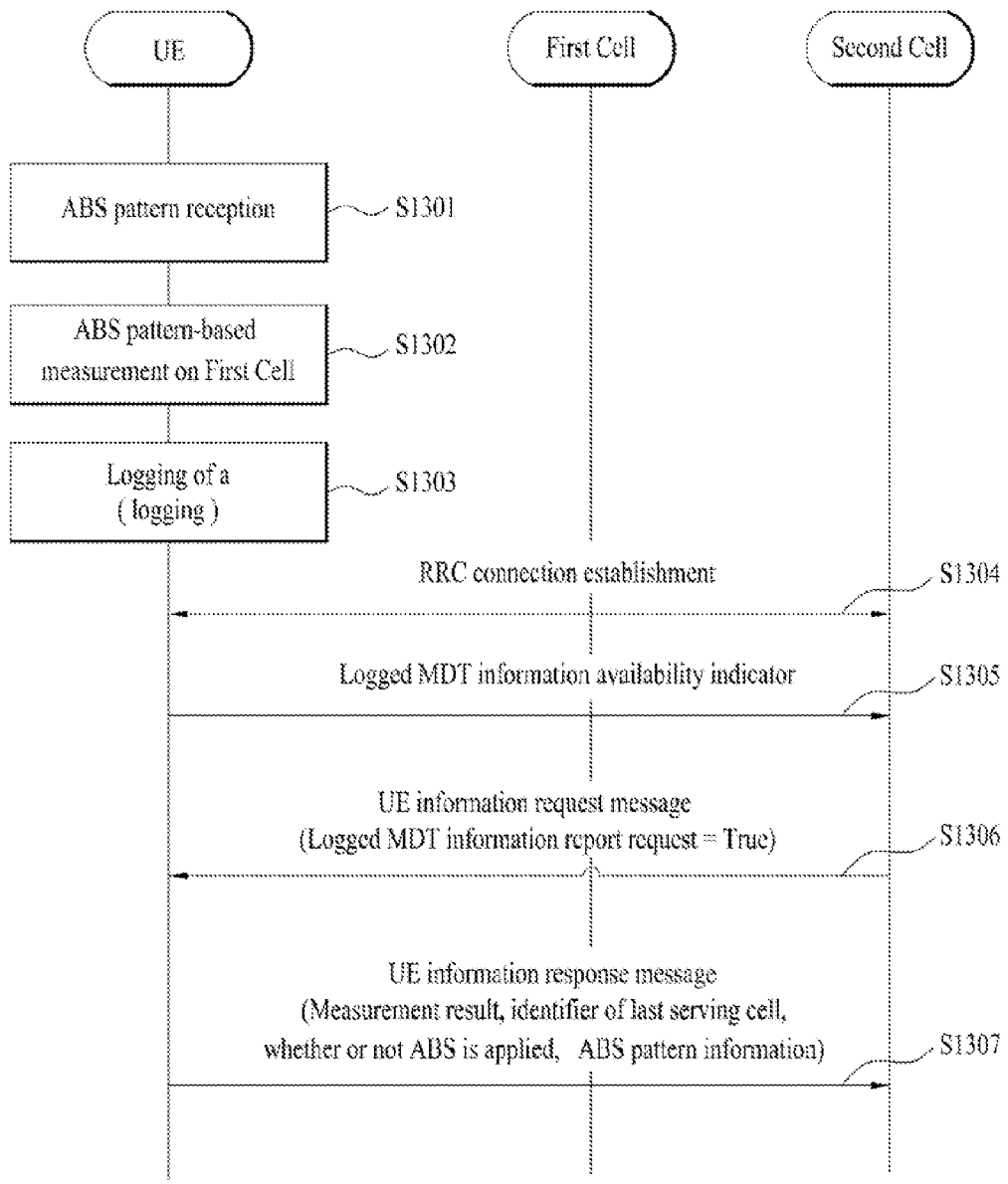
FIG. 13 illustrates a flow chart showing an MDT reporting method according to the present invention.

FIG. 13 illustrates a flow chart showing an MDT reporting method according to the present invention.

Referring to FIG. 13, in order to receive a signal in a state when the Inter-cell interference has been minimized, the user equipment may receive an ABS pattern from the serving cell in step 1301.

Subsequently, the user equipment being in the RRC idle state uses the ANS pattern, in step 1302, so as to measure the quality of the corresponding cell, i.e., the first cell, through the ABS, and, then, the user equipment logs (or stores) the measurement result of the corresponding cell in step 1303.

Meanwhile, the RRC layer of the user equipment being in the RRC idle state may select a new cell, i.e., a second cell, and, in accordance with the request of the NAS layer, the user equipment may perform the RRC connection establishment procedure with the second cell, as shown in step 1304. At this point, the user equipment may include an indicator notifying the availability of the logged MDT information in the RRC connection establishment complete message, as shown in step 1305.

In case the logged MDT information is available, the second cell transmits the UE information request message including the Logged MDT information reporting request (logMeasReportReq) message to the user equipment in step 1306.

After receiving the UE information request message including the Logged MDT information reporting request message, in step 1307, the user equipment configures a UE information response message and transmits the configured message to the second cell. At this point, the UE information response message includes the measurement result of the first serving cell and the cell identifier of the first serving cell, information on whether or not the measurement result has adopted the ABS, and the ABS pattern determined in the first serving cell.

Meanwhile, the present invention may also be adopted and applied to a method for alleviating IDC (In-Device Coexistence) interference. In order to allow the user to access diverse networks whenever and wherever he (or she) wishes, a transceiver for a wireless communication system, such as LTE, WiFi, Bluetooth (BT), and so on, should be equipped to a single user equipment along with a GNSS (Global Navigation Satellite System) receiver. As described above, when different wireless communication systems coexist in a single user equipment, this is referred to as IDC (In-Device Coexistence). Examples of the same may include a user equipment being equipped with LTE and BT modules in order to receive VoIP services, multimedia services, and so on, through BT earphones, a user equipment being equipped with LTE and WiFi modules for traffic distribution, a user equipment being equipped with GNSS and LTE modules in order to additionally acquire location (or position) information, and so on.

In case of the above-described user equipment, due to close-range positioning of diverse transceivers within a single user equipment, the power of a signal being transmitted from a transmitter may be greater than the power of a signal being received by a receiver. In this case, interference may occur between the different communication modules, which may be referred to as an IDC interference. In case the IDC interference becomes more intense, even though there is no problem in the connection between the user equipment and the base station, a ping-pong effect may occur, wherein handover is consistently attempted.

In addition to a cooperation for alleviating (or reducing) the IDC interference between coexisting modules within the user equipment, in case a cooperation for alleviating (or reducing) the IDC interference between the user equipment and the base station exists, the user equipment may provide the base station with interference information for each subframe according to the present invention. More specifically, instead of performing measurement based upon a specific subframe, the overall subframe is measured, and, after deciding subframes each having an interference exceeding a threshold value, the corresponding information is provided to the base station as bitmap information. This is different in that, instead of receiving the ABS pattern from the base station, the user equipment may directly configure a subframe pattern and transmit the configured subframe pattern to the base station.

Figure 14:
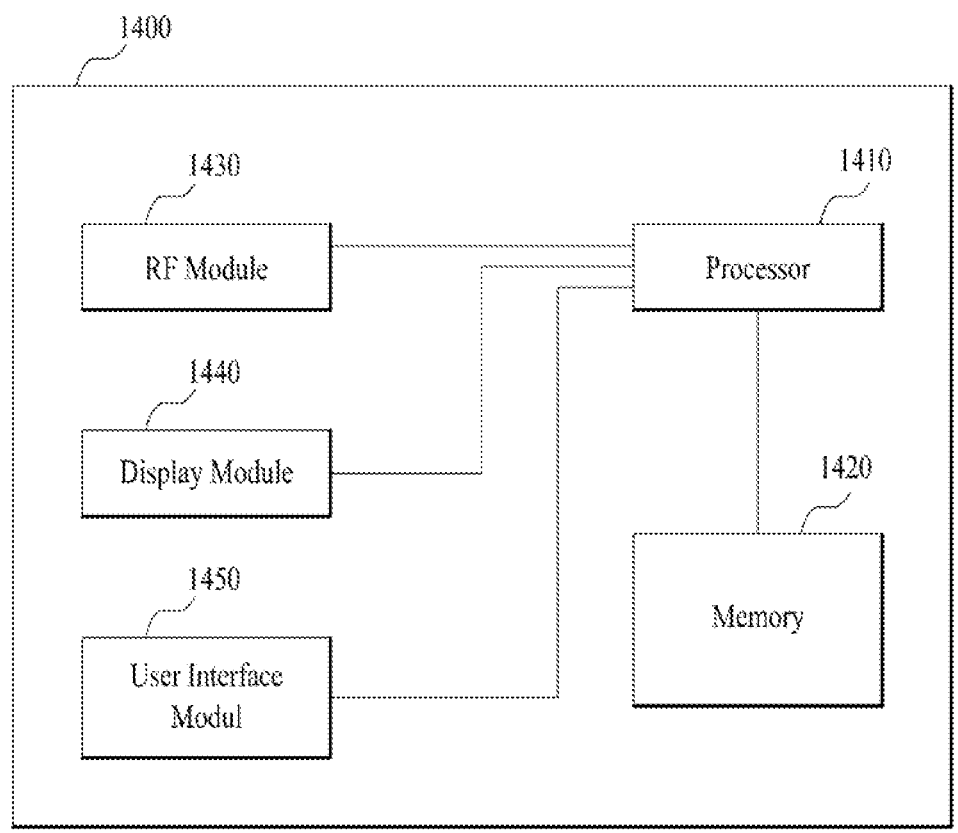
FIG. 14 illustrates a block view showing the structure of a communication device according to an exemplary embodiment of the present invention.

FIG. 14 illustrates a block view showing the structure of a communication device according to an exemplary embodiment of the present invention.

Referring to FIG. 14, a communication device (1400) includes a processor (1410), a memory (1420), an RF module (1430), a display module (1440), and a user interface module (1450).

The communication device (1400) is an exemplary illustration provided to simplify the description of the present invention. Also, the communication device (1400) may further include necessary modules. Also, in the communication device (1400) some of the modules may be divided into more segmented modules. Referring to FIG. 14, an example of the processor (1410) is configured to perform operations according to the embodiment of the present invention. More specifically, for the detailed operations of the processor (1410), reference may be made to the description of the present invention shown in FIG. 1 to FIG. 13.

The memory (1420) is connected to the processor (1410) and stores operating systems, applications, program codes, data, and so on. The RF module (1430) is connected to the processor (1410) and performs a function of converting baseband signals to radio (or wireless) signals or converting radio signals to baseband signals. In order to do so, the RF module (1430) performs analog conversion, amplification, filtering, and frequency uplink conversion or inverse processes of the same. The display module (1440) is connected to the processor (1410) and displays diverse information. The display module (1440) will not be limited only to the example given herein. In other words, generally known elements, such as LCD (Liquid Crystal Display), LED (Light Emitting Diode), OLED (Organic Light Emitting Diode) may also be used as the display module (1440). The user interface module (1450) is connected to the processor (1410), and the user interface module (1450) may be configured of a combination of generally known user interfaces, such as keypads, touchscreens, and so on.

The above-described embodiments of the present invention correspond to predetermined combinations of elements and features and characteristics of the present invention. Moreover, unless mentioned otherwise, the characteristics of the present invention may be considered as optional features of the present invention. Herein, each element or characteristic of the present invention may also be operated or performed without being combined with other elements or characteristics of the present invention. Alternatively, the embodiment of the present invention may be realized by combining some of the elements and/or characteristics of the present invention. Additionally, the order of operations described according to the embodiment of the present invention may be varied. Furthermore, part of the configuration or characteristics of any one specific embodiment of the present invention may also be included in (or shared by) another embodiment of the present invention, or part of the configuration or characteristics of any one embodiment of the present invention may replace the respective configuration or characteristics of another embodiment of the present invention. Furthermore, it is apparent that claims that do not have any explicit citations within the scope of the claims of the present invention may either be combined to configure another embodiment of the present invention, or new claims may be added during the amendment of the present invention after the filing for the patent application of the present invention.

The above-described embodiments of the present invention may be implemented by using a variety of methods. For example, the embodiments of the present invention may be implemented in the form of hardware, firmware, or software, or in a combination of hardware, firmware, and/or software. In case of implementing the embodiments of the present invention in the form of hardware, the method according to the embodiments of the present invention may be implemented by using at least one of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, micro controllers, micro processors, and so on.

In case of implementing the embodiments of the present invention in the form of firmware or software, the method according to the embodiments of the present invention may be implemented in the form of a module, procedure, or function performing the above-described functions or operations. A software code may be stored in a memory unit and driven by a processor. Herein, the memory unit may be located inside or outside of the processor, and the memory unit may transmit and receive data to and from the processor by using a wide range of methods that have already been disclosed.

The present invention may be realized in another concrete configuration (or formation) without deviating from the scope and spirit of the essential characteristics of the present invention. Therefore, in all aspect, the detailed description of present invention is intended to be understood and interpreted as an exemplary embodiment of the present invention without limitation. The scope of the present invention shall be decided based upon a reasonable interpretation of the appended claims of the present invention and shall come within the scope of the appended claims and their equivalents. Therefore, it is intended that the present invention covers the modifications and variations of this invention provided they come within the scope of the appended claims and their equivalents, and it is not intended to limit the present invention only to the examples presented herein.

INDUSTRIAL APPLICABILITY

Although the above-described measurement reporting method of a terminal in a wireless communication system and apparatus therefor are described by mainly focusing on an example applied to the 3GPP LTE system, in addition to the 3GPP LTE system, the present invention may also be applied to a wider range of wireless communication systems.

What is claimed is:

1. A method for processing a signal at a user equipment in a wireless communication system, a signal processing method comprises:
 performing measurement of an in-device coexistence (IDC) interference in a plurality of subframes;
 configuring report information of the IDC interference in the plurality of subframes, the report information of the IDC interference in the plurality of subframes including:
   a bitmap indicating one or more specific subframes in which the IDC interference larger than a threshold has occurred, among the plurality of subframes; and
   a measurement result for the one or more specific subframes having the IDC interference larger than the threshold; and
 transmitting the report information of the IDC interference in the plurality of subframes to a network.

2. The method of claim 1, further comprising:
 receiving a measurement reporting request message from the network,
 wherein the report information of the IDC interference in the plurality of subframes is transmitted to the network as a response to the measurement reporting request message.

3. The method of claim 1, wherein the measurement result includes at least one of RSRP (Reference Signal Received Power), RSRQ (Reference Signal Received Quality), RSSI (Receiving Signal Strength Indicator), and interference level.

4. The method of claim 1, further comprising:
 transmitting a message indicating that reporting of the measurement result is available, when connection is established with the network.

5. A user equipment device in a wireless communication system, the user equipment device comprises:
 a wireless communication module configured to transmit and receive a signal to and from a network; and
 a processor configured to process the signal,
 wherein the processor controls the wireless communication module, so as to
   perform measurement of an in-device coexistence (IDC) interference in a plurality of subframes,
   configure report information of the IDC interference in the plurality of subframes, wherein the report information of the IDC interference in the plurality of subframes includes:
     a bitmap indicating one or more specific subframes in which the IDC interference larger than a threshold has occurred, among the plurality of subframes, and
     a measurement result for the one or more specific subframes having the IDC interference larger than the threshold, and
   transmit the report information of the IDC interference in the plurality of subframes to a network.

* * * * *